(12) United States Patent
Gat et al.

(10) Patent No.: US 7,430,657 B2
(45) Date of Patent: Sep. 30, 2008

(54) SYSTEM, METHOD AND DEVICE FOR QUEUING BRANCH PREDICTIONS

(75) Inventors: Tal Gat, Haifa (IL); Franck Sala, Haifa (IL); Eran Altshuler, Haifa (IL)

(73) Assignee: Intel Corporation, Santa Clara ( * ) Notice: Subject to any disclaimer, the term of this patent is extended or adjusted under 35 U.S.C. 154(b) by 292 days.

(21) Appl. No.: 10/748,173

(22) Filed: Dec. 31, 2003

(65) Prior Publication Data

US 2005/0149708 A1    Jul. 7, 2005

(51) Int. Cl.
     *G06F 9/00* (2006.01)
(52) U.S. Cl. ..................................... 712/240
(58) Field of Classification Search ................. 712/240
See application file for complete search history.

(56) References Cited

U.S. PATENT DOCUMENTS

| | | | | |
|---|---|---|---|---|
| 5,809,320 | A * | 9/1998 | Jain et al. | 712/34 |
| 6,101,577 | A * | 8/2000 | Tran | 711/125 |
| 6,272,624 | B1 * | 8/2001 | Giacalone et al. | 712/239 |
| 6,640,298 | B1 * | 10/2003 | Totsuka et al. | 712/239 |
| 6,732,238 | B1 * | 5/2004 | Evans et al. | 711/128 |
| 6,877,089 | B2 * | 4/2005 | Sinharoy | 712/239 |
| 6,907,520 | B2 * | 6/2005 | Parady | 712/228 |
| 6,976,125 | B2 * | 12/2005 | Kadambi et al. | 711/120 |
| 7,051,186 | B2 * | 5/2006 | Asaad et al. | 712/22 |

OTHER PUBLICATIONS

G. Reinman, T. Austin, and B. Calder, "A Scalable Front-End Architecture for Fast Instruction Delivery," Proceedings of the 26th Annual International Symposium on Computer Architecture(ISCA26), May 1999.*

G. Reinman, B. Calder, and T. Austin. Optimizations enabled by a decoupled front-end architecture. In IEEE Transactions on Computers, Apr. 2001.*

* cited by examiner

*Primary Examiner*—Eddie P Chan
*Assistant Examiner*—Jacob Petranek
(74) *Attorney, Agent, or Firm*—Pearl Cohen Zedek Latzer LLP

(57) ABSTRACT

A system, method and device for storing branch predictions in a queue that may be connected to a branch prediction unit, and for delivering the stored predictions to an instruction fetch unit. A look up may be made of for example two sequential lines, and for example a segmented cache of a branch prediction unit may generate predictions of an address having an even numbered index by referring to for example a first side of the cache, and an address with an odd numbered index by referring to for example a second side of the cache. Branch predictions for two sequential lines may be generated during for example a prediction period such as two clock cycles. In some embodiments, a next instruction pointer of a branch prediction unit may be independent or decoupled from of a next instruction pointer of an instruction fetch unit.

16 Claims, 3 Drawing Sheets

|  | T0 | T1 | T2 | T3 | T4 | T5 |
|---|---|---|---|---|---|---|
| IFU | 100 | 101 | 300 | 301 | 302 | 303 |
| BPU | 100,101 | 102,103 | 300,301 | 302,303 | 304,305 | 306,307 |
| QUEUE |  | WRITE TO QUEUE 100,101 | NO WRITE TO QUEUE |  | WRITE TO QUEUE 302,303 | WRITE TO QUEUE 304,305 |

30 BYPASS

400 — STORING A BRANCH PREDICTION IN A QUEUE

402 — DELIVERING THE STORED PREDICTION TO AN INSTRUCTION FETCH UNIT

SYSTEM, METHOD AND DEVICE FOR QUEUING BRANCH PREDICTIONS

BACKGROUND OF THE INVENTION

Predicting branches of instructions to be fetched in a processor may increase the speed, efficiency and performance of pipelined and superpipelined processors. Some branch prediction units (BPU) may require at least two clock cycles to generate a branch prediction and deliver a predicted branch target to an instruction fetch unit (IFU). An IFU which is to receive branch predictions for the lines that it fetches may be capable of fetching a line in each clock cycle. The number of instructions in such line may be variable. In the absence of an available prediction from a BPU, an IFU may fetch a next sequential line on the assumption that there was no branch from the prior line. If such assumption proves wrong, the next sequential line that was fetched and all instructions in it may be killed or flushed. The wasted fetch of an unneeded line may be called a bubble. Bubbles may decrease the efficiency of a processor.

Some BPU's may generate branch predictions in one cycle. In some BPU's 10 the period required to generate branch predictions may be two cycles or more making the BPU's throughput greater than 1. In some BPU's 10 increasing throughput may require adding a port to a cache of a predictor. Adding such a port may increase the cost of a processor.

In some processors, a BPU and an IFU may share an instruction pointer such that the BPU may generate predictions only on the same address or line for which the IFU is then fetching an instruction.

BRIEF DESCRIPTION OF THE DRAWINGS

Embodiments of the invention will be understood and appreciated more fully from the following detailed description taken in conjunction with the drawings in which.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention. Various examples are given throughout this description. These are merely descriptions of specific embodiments of the invention, but the scope of the invention is not limited to the examples given.

Unless specifically stated otherwise, as apparent from the following discussions, it is appreciated that throughout the specification, discussions utilizing terms such as "processing," "computing," "calculating," "determining," or the like, refer to the action and/or processes of a processor, computer or computing system, or similar electronic computing device, that manipulate and/or transform data represented as physical, such as electronic, quantities within the system's registers and/or memories into other data similarly represented as physical quantities within the system's memories, registers or other such information storage, transmission or display devices.

The processes and displays presented herein are not inherently related to any particular computer, processing device, article or other apparatus. A desired structure for a variety of these systems will appear from the description below. In addition, embodiments of the present invention are not described with reference to any particular processor, programming language, machine code, etc. It will be appreciated that a variety of programming languages, machine codes, etc. may be used to implement the teachings of the invention as described herein.

Figure 1:
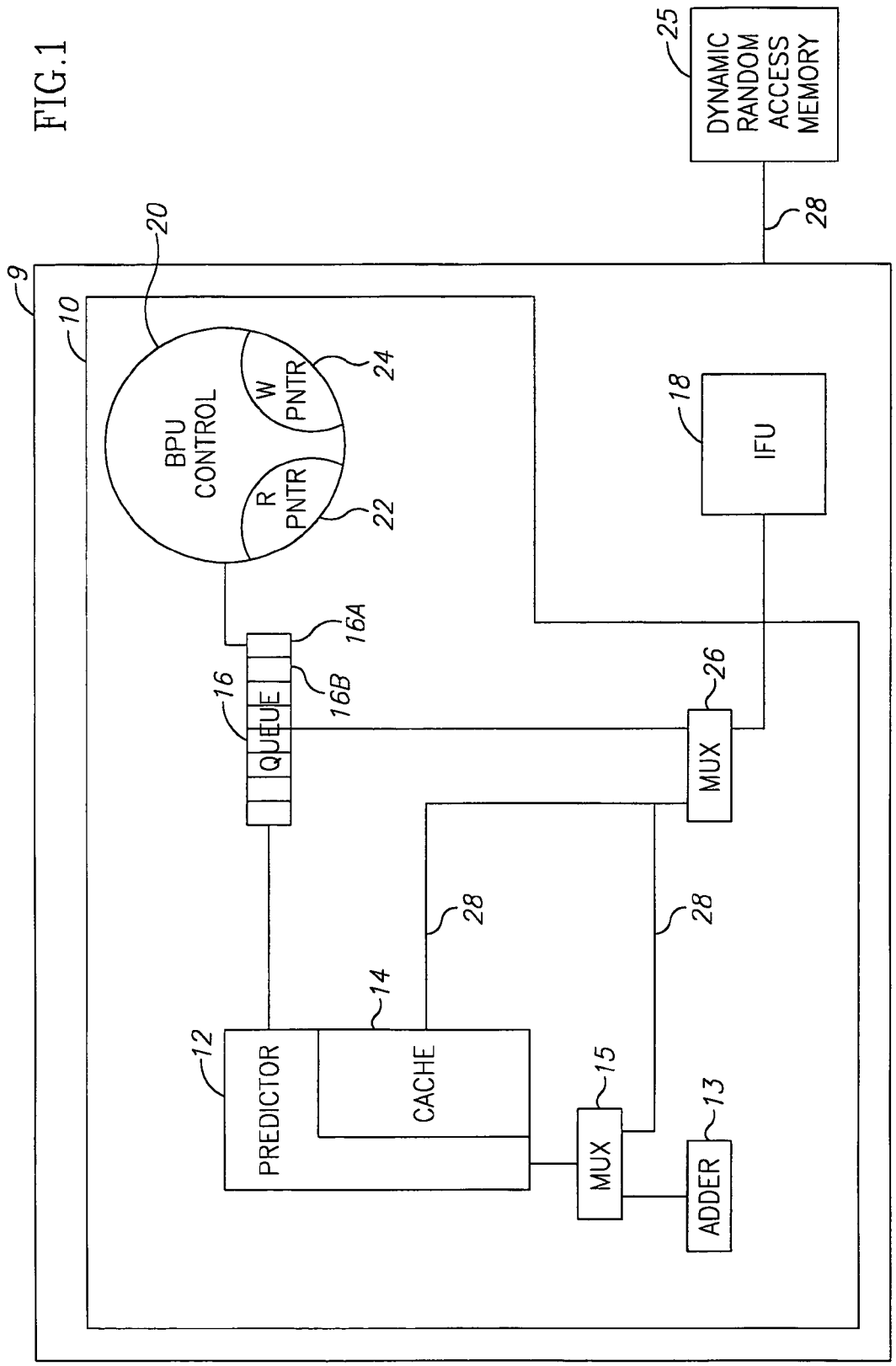
FIG. 1 is a schematic illustration of a branch prediction unit and an instruction fetch unit of a processor in accordance with an exemplary embodiment of the invention.

Reference is made to FIG. 1, a schematic illustration of a BPU and an IFU of a processor in accordance with an embodiment of the invention. FIG. 1 shows a processor 9 that includes, among other components, a BPU 10 and an IFU 18. BPU 10 includes one or more predictors 12 with one or more caches 14 and a queue 16. Predictor 12 may generate branch predictions and pass or deliver such predictions to queue 16 and/or to other components such as, for example, a bypass multiplexer (mux) 26. Mux 26 may transfer branch predictions from predictor 12 and/or queue 16 to IFU 18. Other paths for the transfer or delivery of predictions from BPU 10 to IFU 18 are possible.

BPU 10 may include a BPU control unit 20. BPU control unit 20 may perform functions including for example receipt of prediction requests from IFU 18, delivery of branch target clear commands to IFU 18, and control of a queue read pointer 22 and queue write pointer 24, etc.

Predictor 12 may be or include components such as data storage components that may for example store and update branch history information or other data used to predict whether an instruction corresponding to an address will branch, and the prediction of a branch target.

Queue 16 may be for example memory or a data storage area accessible to BPU 10 in which may be stored branch predictions corresponding to particular lines in a stream of for example line addresses. In some embodiments queue 16 may include eight entries, depicted for example as 16A, 16B etc. Other numbers of entries in a queue 16 are possible. An entry in queue 16 may in some embodiments include storage sufficient to store an indication of whether a line will branch and a target of such branch. Other data may also be stored in an entry of a queue 16. In some embodiments, queue 16 may be a data storage area configured other than as a series of entries.

The number of predictions stored in queue 16 may be tracked by read pointer 22 which may be incremented for example when a prediction is read from the queue 16 to the IFU 18. Similarly, write pointer 24 may increment an index of queue 16 when a branch prediction is stored in the queue 16. By tracking the spread between read pointer 22 and write pointer 24, BPU controller 20 may determine for example whether there are sufficient predictions to service IFU 18, or whether, as described below, a by-pass may be required to provide a branch prediction in the same clock cycle as such prediction is stored in queue 16.

IFU 18 may fetch lines and provide lines to a line splitter or instruction queue (not shown). IFU 18 may receive branch predictions from BPU 10, and may use such branch predictions to fetch a target of a branch rather than a next sequential line.

In some embodiments, processor 9 may be connected directly or indirectly to a mass storage unit 25 such as for example a hard disc drive, a random access memory unit, dynamic random access memory unit, static random access memory or a floppy disc drive.

One or more buses 28 or other connections may link or connect the various components of BPU 10, and may link or connect BPU 10 directly or indirectly with for example IFU 18 or other components of processor 9.

Input of a stream of addresses or lines into BPU 10 may be fed by for example an adder 13 which may increment an address of a look up by for example 10 (or 20 in the case of a look up of two sequential lines) to derive the next sequential line for which predictions are to be generated by PBU 10. Branch predictions from BPU 10 may also be used as an input for BPU 10 such that a BPU 10 may generate a prediction for the branch target that it predicted. Other sources of addresses that may be inputs into BPU 10 are possible. In some embodiments inputs to BPU 10 may be passed through mux 15. In some embodiments, addresses input into BPU 10 may be independent of or decoupled from addresses for which IFU 18 fetches instructions.

Figure 2:
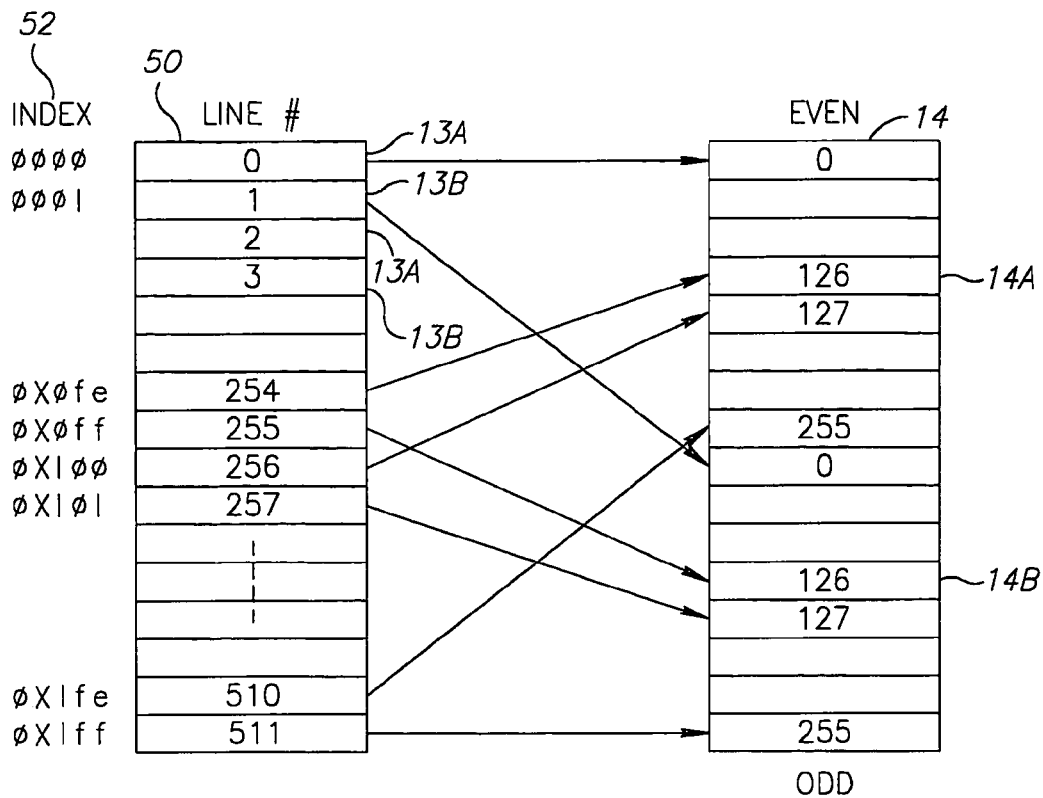
FIG. 2 is a schematic, conceptual illustration of the storage of sequential lines in a segmented cache in accordance with an embodiment of the invention.

Reference is made to FIG. 2, which is a schematic, conceptual illustration of the placement of sequential lines in a segmented cache in accordance with an embodiment of the invention. FIG. 2 depicts a series of sequential lines 50 numbered 0, 1, 2, 3, etc. Cache 14 is depicted as segmented into two parts, segments or sides including an even side 14A and an odd side 14B, such that a cache 14 that might have had 512 entries, would when segmented, have two sides of 256 entries each. Other numbers of entries may be used, other numbers of segments or sides may be used, and other designations or segmentations are possible. The segmented entries may have sufficient data storage capacity to store for example a tag, certain branch information and a valid bit. Other information may be stored in such entries and other data structures may be used for such storage. As used herein, the terms 'even' and 'odd' are designations. Other nomenclatures may be used.

In some embodiments, BPU 10 may perform a look up or may otherwise receive 32 bytes of address data from a stream of lines. Such 32 bytes may in some embodiments include a set of two sequential lines for which branch predictions may be generated. The least significant bit of the index 52 of one of such set of two sequential line addresses may be a 0, making such address an even address 13A. The least significant bit of an index of another of such two sequential line addresses may be a 1, making such address an odd address 13B. For example, as depicted in FIG. 2, branch information for a line with an index of 000 may be stored in entry 0 on even side 14A and branch information for next sequential line 001 may be stored in entry 0 on odd side 14B. Similarly, a line with an index ending with 254 may be stored in entry 126 of even side 14A, and the next sequential line 255 may be stored in entry 126 of odd side 14B. Other suitable methods of creating a correspondence between indexes and segments may be used, and other numbers of bits may be used in such correspondences.

In an exemplary embodiment of the invention, by referring to the index of for example even address 13A, BPU 10 may locate the entry on even side 14A of cache 14 that corresponds to even address 13A. Since addresses 13A and 13B are sequential, the same entry in odd side 14B will correspond to the index of odd address 13B. Predictor 12 may determine if data stored in either of the entries on the odd side 14A or even side 14B that correspond to the index of for example even address 13A or odd address 13B indicate that a branch is to be taken by either of said addresses. By referring for example to the least significant bit of the indexes of even address 13A and 13B, BPU 10 may in some embodiments determine whether such branch is from even address 13A or odd address 13B. If no branch is indicated from either of such entries, then no such determination may be required. In some embodiments, segmented cache 14 may enable BPU 10 to locate an entry number for two sequential lines at a time and to generate predictions for such two lines. In some embodiments for example, a BPU 10 that may generate branch predictions for a line and deliver the prediction and target branch to an IFU 18 in a two cycle prediction period, may generate a branch prediction for two sequential lines and write such predictions to queue 16 in such two cycle prediction period. In some embodiments, the throughput of a BPU 10 that would otherwise generate one prediction in a two cycle prediction period, may be improved to generate two predictions and to write such predictions to queue 16 in such prediction period. Other lengths for prediction periods may be used.

The availability of predictions stored in queue 16 may be tracked by read pointer 22 which may be incremented for example when a prediction is read from queue 16 to IFU 18. Similarly, write pointer 24 may increment an index of queue 16 when a branch prediction is stored in the queue. By tracking the spread between read pointer 22 and write pointer 24, BPU controller 20 may determine for example whether there are sufficient predictions to service IFU 18, or whether, as described herein, a by-pass may be called for to provide a branch prediction in the same clock cycle as such prediction is stored in queue 16.

Figure 3:
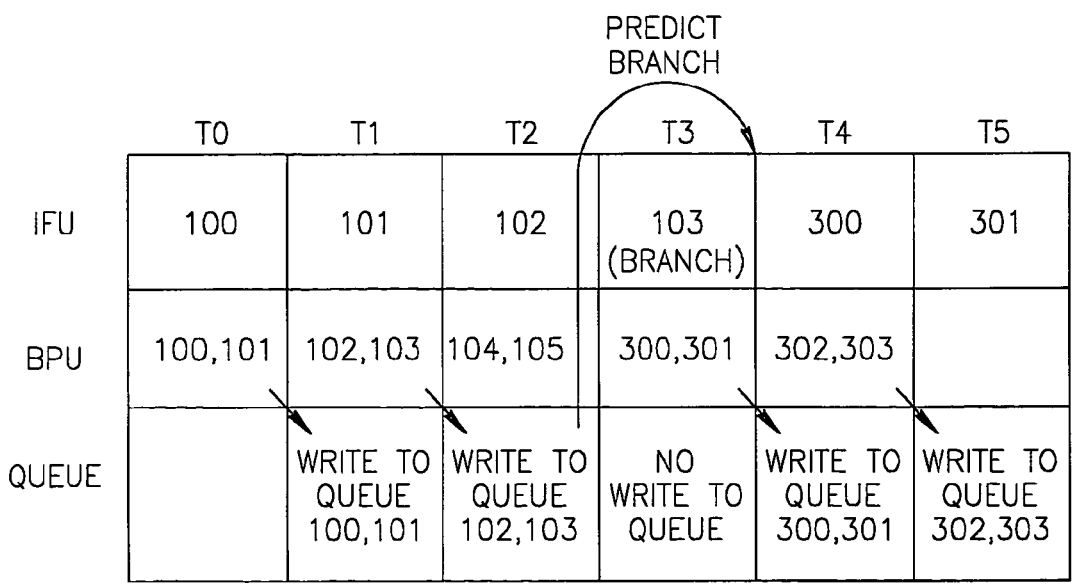
FIG. 3 is a chart with examples of lines about which branch predictions may be generated and stored by a branch prediction unit in accordance with an exemplary embodiment of the invention.

Reference is made to FIG. 3, a chart with examples of lines about which branch predictions may be generated and stored by BPU, and for which instructions may be fetched by IFU in accordance with an exemplary embodiment of the invention. The chart is provided by way of example only, and in other embodiments instructions may take other suitable forms. FIG. 3 depicts a series of clock cycles, designated as T0 to T5. For example in the clock cycle T0-T1, BPU 10 may perform a 32 byte look up (other suitable byte lengths may be used) that includes addresses of lines designated as for example 100 and 101, and may generate branch predictions in respect of both of such lines. BPU 10 may start generating predictions for 100 and 101 in clock cycle T0, and by the end of T1 may complete the prediction, store the generated predictions in for example entries 16A and 16B, respectively, of queue 16, and, if necessary, deliver the predictions to IFU 18 through a by-pass as described herein. In T0-T1, IFU 18 may fetch instructions corresponding to addresses 100 and 101. In T1, BPU 10 may begin generating predictions for line 102 and 103 while IFU 18 fetches an instruction corresponding to address 101. In one example, BPU 10 may predict a branch from address 103, indicating that an instruction corresponding to line 300 should be fetched after the instruction corresponding to line 103. This prediction may be written to queue 16 in T2 and may be delivered to IFU 18 by the BPU 10 in T3, in time for IFU 18 to fetch the predicted instruction for line 300 for period T8 rather than fetching the next sequential instruction corresponding to line 104. In T2, BPU 10 may start predicting addresses 104 and 105, but by the end of T2, BPU may know that because of a branch from 103 to 300, the predictions of 104 and 105 are not relevant and such predictions may not be written to queue 16 since the BPU 10 predicted a branch away from lines 104 and 105. In T3, BPU 10 may start generating predictions for lines 300 and 301, and may write such predictions to the queue 16 in time for their delivery to IFU 18 in T4. The prediction for line 300 may be written to queue 16 in T4, in time for its delivery to IFU 18 when IFU 18 fetches an instruction corresponding to line 300.

In some embodiments of the invention there may be prevented a fetch by IFU 18 of a next sequential instruction when, for example, an immediately preceding instruction branched away from such next sequential instruction. Such prevented fetch of an instruction may eliminate or reduce the number of 'bubbles' or lines that are entered into an IFU 18 but are not needed, and may be flushed because a preceding instruction branched away from the fetched line.

Figures 4, 5:
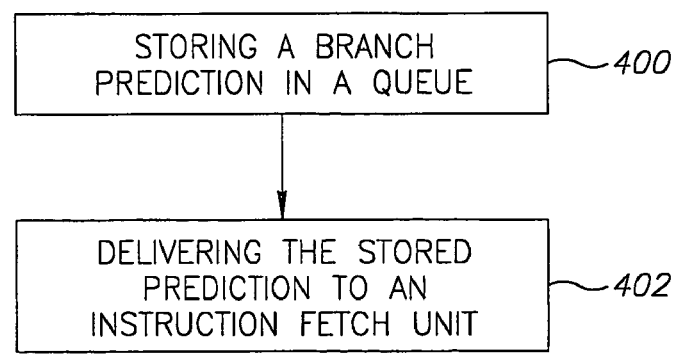
FIG. 4 is a chart with examples of lines about which branch predictions may be generated and stored, and showing an example of a bypass scenario in accordance with an exemplary embodiment of the invention.
FIG. 5 is a flow chart diagram of a method in accordance with an embodiment of the invention.

Reference is made to FIG. 4 showing examples of line addresses about which branch predictions may be generated and stored, and showing an example of a bypass scenario in accordance with an exemplary embodiment of the invention. The chart is provided by way of example only, and in other embodiments instructions may take other suitable forms. In period T0 of FIG. 4, BPU 10 may for example predict that the instruction from line 101 will branch away from line 102. In period T1, BPU 10 writes its prediction of line 100 and 101 to entries of queue 16. However, by the end of T1, IFU 18 needs a prediction to follow line 101. To satisfy this need, by the end of T1, BPU 10 may both write predictions to queue 16 and deliver to IFU 18 a prediction generated in an immediately preceding clock cycle, such as T0-T1. Such a delivery to both queue 16 and to IFU 18 may be called a bypass, depicted by curved arrow 30, and may be implemented for example when a prediction has not been stored in queue 16 prior to when it is needed by IFU 18.

In some embodiments, the address for which BPU 10 may be generating a prediction at a particular time may not be the same as the address for which IFU 18 is performing an instruction fetch at such time. In some embodiments, a next instruction pointer (NIP) for BPU 10 may be different from, and independent of, a NIP for IFU 18. This independence or de-coupling of the BPU's 10 NIP from the IFU's 18 NIP may in some embodiments permit BPU 10 to continue generating predictions on a stream of addresses even when IFU 18 may have stalled or otherwise reached a stop or delay in its fetching of instructions.

Reference is made to FIG. 5 a flow chart diagram of a method in accordance with an embodiment of the invention. In block 400, a BPU may store a branch prediction in a queue or other suitable data structure. In some embodiments BPU may do a look up of 32 bytes of an address stream which may include two sequential lines. Other number of bytes may be included in a look up. The index of an address of one of such two sequential addresses may be for example even, as indicated by the least significant bit of the index of such address, and the index of an address of another of such two sequential addresses may be for example odd. In some embodiments, certain bits of the index of an address may correspond to one of 256 entries on a side of a segmented cache included in the BPU. Entries corresponding to even numbered addresses or addresses with even numbered indexes may be on an even side of the segmented cache, and entries corresponding to odd addresses or odd numbered indexes may be on the odd side of the segmented cache. Other number of cache segments may be used.

In some embodiments, if a branch target is to an address with an odd index, BPU may perform a look up of both an even address and such odd address, but may ignore the prediction for the even address.

In some embodiments, a BPU may generate branch predictions for two sequential addresses creating a throughput of one address in each cycle. In a following clock cycle such branch predictions may be stored in entries of a queue. In some embodiments each branch prediction may be stored in a separate entry of a queue.

In block 402, branch predictions that were stored in an entry of a queue may be delivered to IFU, possibly in time to alert IFU of a branch away from a next sequential address.

In some embodiments, a branch prediction may not yet have been stored in a queue when such prediction is needed by an IFU. In such case, a BPU may both deliver a prediction to an IFU, and store such prediction in an entry of a queue. The delivery of such instruction to the IFU may be said to by-pass the queue in that it may be delivered to the IFU before or during the same for example two clock cycle period as it is also written to the queue.

In some embodiments, a BPU may generate predictions for a line that is not the same line as is being fetched by an IFU at the same time. The NIP of the BPU may therefore be independent or decoupled from the NIP of the IFU. The BPU may in some embodiments be capable of continuing to generate predictions for a stream of addresses even though an IFU may have stalled, stopped or otherwise been delayed in fetching instructions corresponding to such stream of addresses.

Other steps or series of steps may be used.

It will be appreciated by persons skilled in the art that embodiments of the invention are not limited by what has been particularly shown and described hereinabove. Rather the scope of at least one embodiment of the invention is defined by the claims below.

We claim:

1. A method comprising:
generating branch predictions for two sequential lines in parallel during a prediction period by:
determining if data stored in entries of a first side or a second side of a cache of a branch predictor indicates that a branch is to be taken by either of the entries; the cache being segmented into the first side and the second side, where the entries on the first side correspond to a set of addresses having even-numbered indexes, and entries on the second side correspond to a set of addresses having odd-numbered indexes;
storing said branch predictions in a queue; and
bypassing a branch prediction to an instruction fetch unit by the end of a clock cycle in which said branch prediction is stored in said queue.

2. The method as in claim 1, wherein said prediction period comprises two clock cycles.

3. The method as in claim 1, wherein an index of one of two sequential lines corresponds to an entry on said first side of said cache, and an index of another of said two sequential lines corresponds to an entry on said second side of said cache.

4. The method as in claim 1, comprising generating branch predictions for a stream of addresses during a stall of said instruction fetch unit.

5. The method as in claim 1, comprising generating during a cycle a prediction for a line, said line being other than the line being fetched by said instruction fetch unit during said cycle.

6. The method as in claim 1, wherein the addresses for which predictions are generated by a branch prediction unit are decoupled from the addresses for which lines are fetched by said instruction fetch unit.

7. The method as in claim 1, comprising delivering a branch prediction to said instruction fetch unit in the same prediction period as said branch prediction is written to said queue.

8. A processor for generating branch predictions for two sequential lines in parallel during a prediction period, the processor comprising:
- an instruction fetch unit;
- a branch prediction unit comprising a cache whose entries are segmented into a first side and a second side, where entries on the first side correspond to a set of addresses having even-numbered indexes, and entries on the second side correspond to a set of addresses having odd-numbered indexes; and
- a queue to store branch predictions,
- wherein said branch prediction unit is to bypass a branch prediction to said instruction fetch unit by the end of a clock cycle in which said branch prediction is stored in said queue.

9. The processor as in claim 8, wherein said cache is to store odd-numbered addresses in a first segment of said cache, and even-numbered addresses in a second segment of said cache.

10. The processor as in claim 8, wherein said prediction period comprises two clock cycles.

11. The processor as in claim 8, wherein said branch prediction unit is, in a prediction period, to write a branch prediction to said queue and to deliver said branch prediction to said instruction fetch unit.

12. A system comprising:
- a dynamic random access memory unit; and
- a processor for generating branch predictions for two sequential lines in parallel during a prediction period, the processor comprising:
  - an instruction fetch unit;
  - a branch prediction unit comprising a cache whose entries are segmented into a first side and a second side, where entries on the first side correspond to a set of addresses having even-numbered indexes, and entries on the second side correspond to a set of addresses having odd-numbered indexes; and
  - a queue to store branch predictions and to decouple said branch prediction unit from said instruction fetch unit,
  - wherein said branch prediction unit is to bypass a branch prediction to said instruction fetch unit by the end of a clock cycle in which said branch prediction is stored in said queue.

13. A system as in claim 12, wherein said cache is configured to store odd addresses in said odd side, and even addresses in said even side.

14. The system as in claim 12, wherein said prediction period comprises two clock cycles.

15. The system as in claim 12, wherein said branch prediction unit is, in a prediction period, to write a branch prediction to said queue and to deliver said branch prediction to said instruction fetch unit.

16. The system as in claim 12, wherein the addresses for which predictions are generated by said branch prediction unit are decoupled from the addresses for which lines are fetched by said instruction fetch unit.

* * * * *